April 6, 1926.  E. BERTSCHE  1,579,630
UNIVERSAL JOINT
Filed Oct. 15, 1923
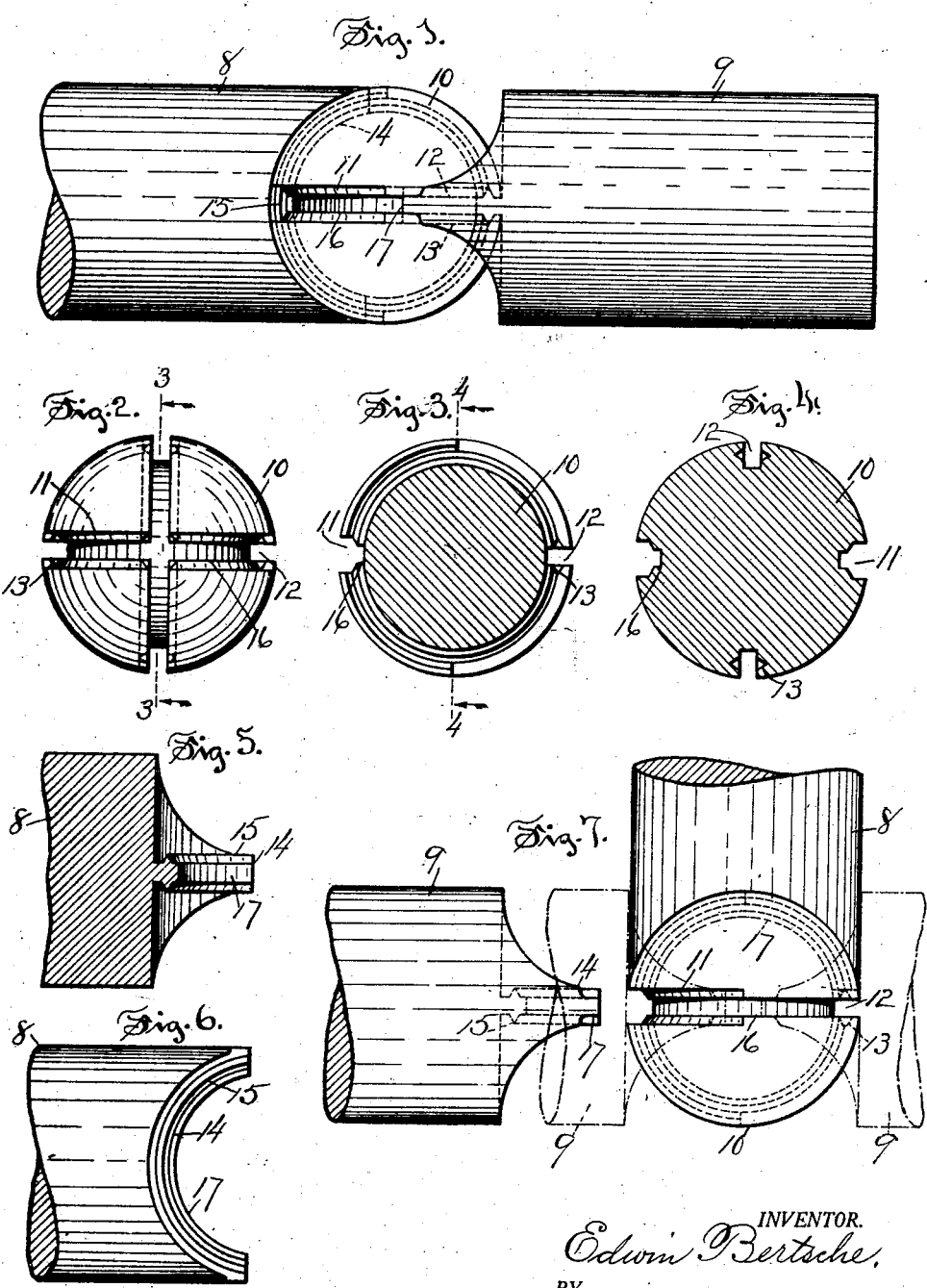
INVENTOR.
Edwin Bertsche,
BY
Arthur B Jenkins
ATTORNEY.

Patented Apr. 6, 1926.

1,579,630

UNITED STATES PATENT OFFICE.

EDWIN BERTSCHE, OF ROCKVILLE, CONNECTICUT.

UNIVERSAL JOINT.

Application filed October 15, 1923. Serial No. 668,495.

*To all whom it may concern:*

Be it known that I, EDWIN BERTSCHE, a citizen of the Republic of Switzerland, and a resident of Rockville, in the county of Tolland and State of Connecticut, have invented new and Improved Universal Joints, of which the following is a specification.

My invention relates to the class of devices above named, and an object of my invention, among others, is the provision of a device of this class the members of which may be readily connected and disconnected, said parts having simple means for retaining them in engagement one with another.

One form of device embodying my invention and in the construction and use of which the objects herein set out, as well as others, may be attained, is illustrated in the accompanying drawings, in which—

Figure 1 is a side view of a universal joint embodying my invention.

Figure 2 is a view of the connecting member of the joint.

Figure 3 is a view in section on a plane denoted by the dotted line 3—3 of Figure 2.

Figure 4 is a view in section of said connecting member on a plane denoted by the dotted line 4—4 of Figure 3.

Figure 5 is a detail view in section through one end of one of the shaft members.

Figure 6 is a side view of the same.

Figure 7 is an illustrative view showing the manner of engaging and disengaging the members of the joint.

In the accompanying drawings the numerals 8—9 denote the ends of shaft members comprising a portion of my improved universal joint, and 10 denotes the connecting member forming part of said joint. This connecting member is preferably of spherical shape with grooves extending around it at substantially right angles one to another. Each of these grooves is, except as to location, a duplicate of the other groove, each of said grooves comprising a releasing portion 11 and a locking portion 12. The locking portion 12 of each groove has locking grooves 13 formed in its opposite side walls. The end of each of the shaft members is gradually narrowed and recessed to form an engaging rib 14, and each engaging rib has a locking rib 15 projecting from each side thereof, the recess in the end of each shaft member being on the arc of a circle, as shown in Figure 6 of the drawings, to fit within the releasing and locking portions of the grooves in the connecting member 10. The releasing portions 11 of each of the grooves in the connecting member is of a width equal to the distance across each engaging rib from the crown of one locking member on one side of said engaging rib to the crown of the engaging rib on the opposite side thereof, and the distances from the bottoms of the locking grooves 13 to the bottoms of the oppositely formed locking grooves is substantially the same as the distance from crown to crown of said locking ribs.

From this it will be seen that when the shaft members and the connecting member are operatively assembled, as shown in Figure 1, the locking ribs 15 will be engaged within the locking grooves 13 and all of said parts will thus be locked together. To engage said members the ribbed portion of one of the shaft members, as 8, is inserted in the releasing portion 11 of one of the grooves and is then swung to a position at right angles to that occupied when it was first engaged, and as shown in Figure 7 of the drawings. The other shaft member 9 is then inserted in the releasing portion of the opposite groove in the connecting member 10, and as illustrated in dotted lines at the left of Figure 7. This may now be swung to a position on the diametrically opposite side of the connecting member, and as shown by the dotted lines in Figure 7 of the drawings. The engagement of the parts may now be completed by swinging the shaft member 8 to the left and to the position formerly occupied by the shaft member 9. The recesses in the ends of each of the shaft members do not comprise quite one-half of the circumference of the grooves in the connecting member 10, this for the purpose of enabling ready engagement of the parts.

In the preferred form of construction a steadying groove 16 is formed in the bottom of each of the locking and releasing grooves, and a steadying rib 17 is formed on each of the engaging ribs 14 to fit within the steadying groove and thereby tend to prevent twisting or lateral movement of the ends of the shaft members within the grooves in the connecting member.

In accordance with the provisions of the patent statutes I have described the principles of operation of my invention, together with the device which I now consider to represent the best embodiment thereof; but I desire to have it understood that the device shown is only illustrative, and that the invention may be carried out by other means.

I claim—

1. A universal joint comprising a spherically shaped connecting member having a releasing groove and a locking groove with a narrowed portion, and a connected member having a locking rib to be received in the wider portion of said locking groove, said rib being wider than the narrowed portion of said locking groove.

2. A universal joint comprising a connecting member having a groove comprising a releasing portion with a locking portion opening thereoutof and having a narrowed part, and a connected member having a locking rib to be passed from the releasing portion of said groove into locked engagement with the locking portion of said groove, said rib being wider than the narrowed part of said locking groove.

3. A universal joint comprising a connecting member having a groove including a releasing portion and a locking portion opening thereoutof, and a shaft member having a cutaway end to form an engaging rib to fit said releasing groove and locking ribs formed on opposite sides of said engaging rib to be received within said locking portion of said groove.

4. A universal joint comprising a spherically shaped connecting member formed of a single piece and having two grooves extending at right angles to each other around said connecting member, and two shaft members having cut-away ends formed with engaging ribs, said engaging ribs having locking ribs to be removably received within said locking grooves, whereby the parts may be supported by a swinging movement of the shaft member.

5. A universal joint comprising a connecting member having a groove including a releasing portion and a locking portion with a steadying groove in the bottom of said releasing and locking portions, and a connected member having an engaging rib with locking ribs on opposite sides thereof and with a steadying rib on the outer edge.

EDWIN BERTSCHE.